Figure 1:
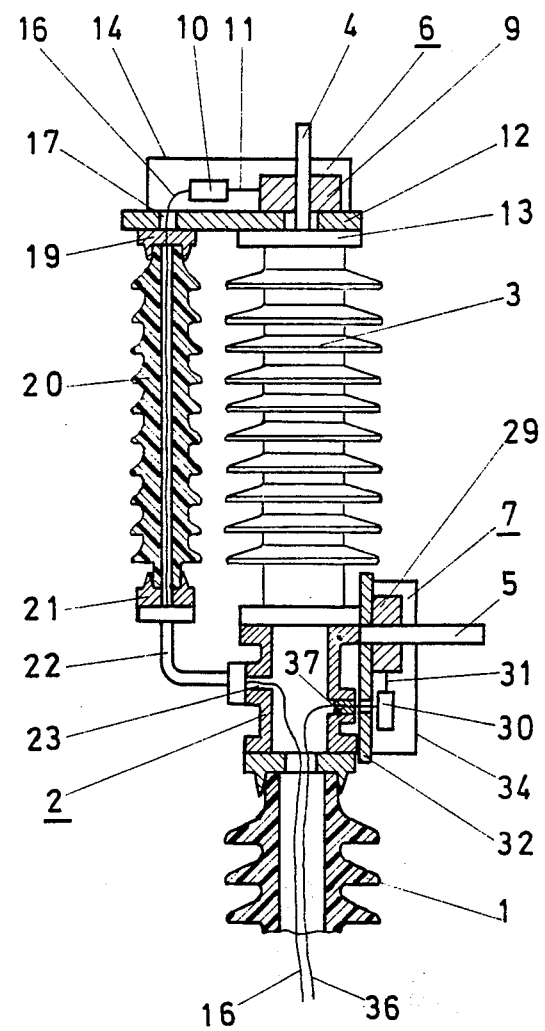

United States Patent [19]

Mauthe

[11] Patent Number: 4,742,197
[45] Date of Patent: May 3, 1988

[54] HIGH-VOLTAGE SWITCH

[75] Inventor: Gerhard Mauthe, Birmenstorf, Switzerland

[73] Assignee: BBC Brown Boveri Ltd., Switzerland

[21] Appl. No.: 21,646

[22] Filed: Mar. 4, 1987

[30] Foreign Application Priority Data

Mar. 21, 1986 [CH] Switzerland .................. 1156/86

[51] Int. Cl.$^4$ .................. H01H 33/54; H01H 33/02
[52] U.S. Cl. .................. 200/148 B; 200/144 R; 200/148 R; 200/150 R
[58] Field of Search .......... 200/148 B, 148 R, 144 R, 200/150 R

[56] References Cited

U.S. PATENT DOCUMENTS 3,689,777 9/1972 Nitta .................. 200/148 R
3,806,682 4/1974 Mauthe et al. .......... 200/148 B
4,521,657 6/1985 Thuries .................. 200/148 B Primary Examiner—Robert S. Macon
Attorney, Agent, or Firm—Ostrolenk, Faber, Gerb & Soffen

[57] ABSTRACT

The high-voltage switch filled with an insulating medium has at least one interrupter chamber (3, 3a) fixed on a central housing (2) supported by an insulator column (1). Fitted in the region of the at least one interrupter chamber (3, 3a) is at least one measuring head (6), in which a sensor (9) picks up current-proportional measuring signals. These measuring signals are transmitted via an optical waveguide (16) at ground potential for further processing.

A high-voltage switch is to be created in which sensors (9, 39) can be fitted by simple means in easily accessible manner outside in the region of the interrupter chamber (3, 3a). This is achieved by the at least one measuring head (6) being accommodated in a housing suitable for fitting outside on the high-voltage switch. In this arrangement, the optical waveguide (16) is led pressure-tight through a closure cover (38) of a fitting opening into the central housing (2).

12 Claims, 2 Drawing Sheets

HIGH-VOLTAGE SWITCH

The invention is based on a high-voltage switch according to the first part of claim 1.

Swiss Patent Specification No. 648,415, in particular FIG. 1 therein, discloses a high-voltage switch filled with an insulating medium and having at least one interrupter chamber supported by a hollow insulator column and connected to it via a central housing. Arranged inside this high-voltage switch, in the region of the interrupter chamber is a sensor which picks up current-proportional measuring signals. These measuring signals are transmitted at ground potential via optical waveguides, led through the inside of the hollow insulator column, for further processing.

Design arrangements have to be made in the case of this high-voltage switch for the installation of the sensor. After installation of the sensor, the latter is only accessible with great difficulty for any checks or changes to the measuring range, namely not until the interrupter chamber has been disassembled.

This is where the invention is intended to provide a remedy. The invention, as characterized in the claims, achieves the object of creating a high-voltage switch in which sensors can be fitted by simple means, in easily accessible manner outside in the region of the interrupter chamber.

The advantages achieved by the invention are to be seen essentially in that the sensors are accessible easily and without disassembly of the interrupter chamber for any measuring range readjustments, checks or inspections. Furthermore, the retrofitting of sensors in high-voltage switches already supplied, for example, if the protection concept of an existing high-voltage switching system has to be changed for operational reasons, is possible by comparatively simple means and without appreciable operational interruptions in the high-voltage switching system.

The further developments of the invention are subjects of the dependent claims.

Figure 2:
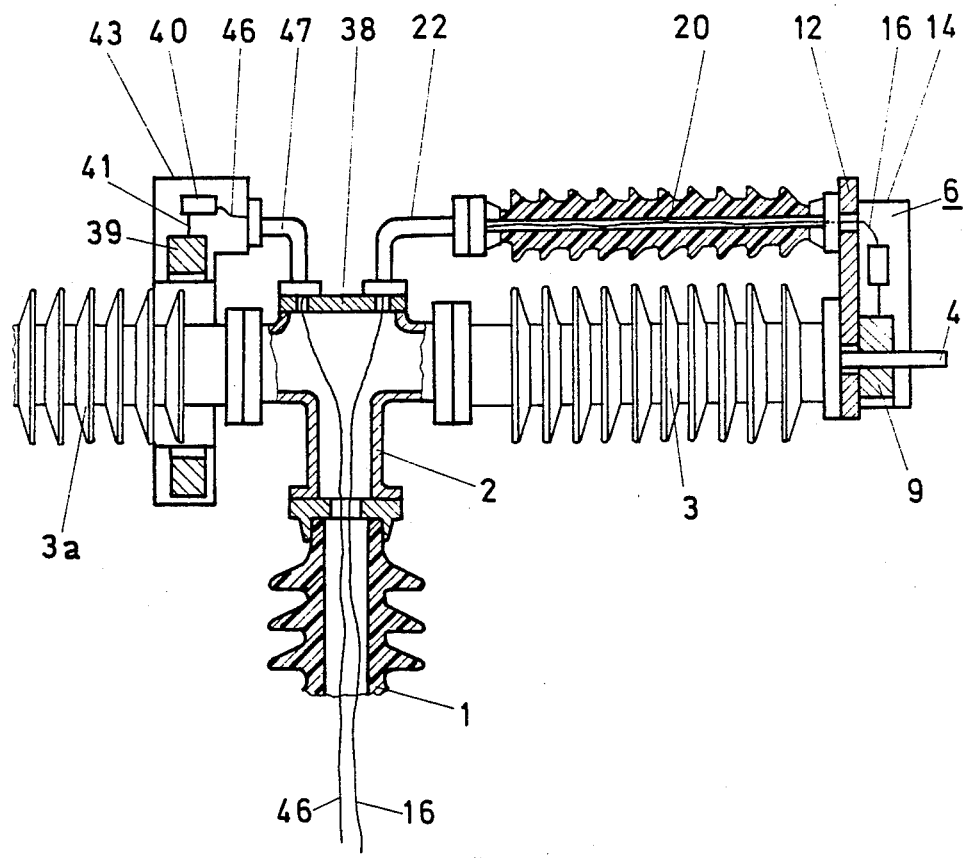

The invention will be explained in more detail below with reference to the drawings, in which:

FIG. 1 shows a first embodiment of the high-voltage switch according to the invention, and FIG. 2 shows a second embodiment of the high-voltage switch according to the invention.

Elements acting in the same way are provided with the same reference symbols in both figures.

FIG. 1, shows a high-voltage switch which has an electrically conductive central housing 2 fitted vertically on a hollow insulator column 1 and supports an interrupter chamber 3 with two supply terminals 4, 5. The high-voltage switch is filled with a gaseous or liquid quenching and insulating medium. Drive elements which serve to actuate the interrupter chamber 3 are not shown in FIG. 1. Also provided in the region of the interrupter chamber 3 are measuring heads 6, 7, to be precise one at each of the two supply terminals 4, 5, the supply terminal 4 being in connection with the interrupter chamber 3 from the top and the supply terminal 5 being connected from the side to the bottom part of the interrupter chamber 3, via the central housing 2. The supply terminal 4 is assigned the measuring head 6 and the supply terminal 5 is assigned the measuring head 7.

The measuring head 6 has a sensor 9, which surrounds the supply terminal 4 and, if it is necessary for the respective sensor principle, an electronics unit 10, which is connected to the sensor 9 by a measuring line 11. The sensor 9 and the electronics unit 10 are supported on an intermediate flange 12, which has the supply terminal 4 passing through it and is in connection with the upper coupling flange 13 of the interrupter chamber 3. Together with a cover 14, the intermediate flange 12 forms a housing, which protects the measuring head 6 against environmental effects. The electronics unit 10 has at least one optical waveguide port in which at least one optical waveguide 16 can be plugged. The at least one optical waveguide 16 is led through a borehole 17 in the intermediate flange 12. An insulating tube 20 is connected to the underside of the intermediate flange 12 by means of a flange 19. The at least one optical waveguide 16 is led pressure-tight through the flange 19 into the interior of the insulating tube 20. The bottom of the insulating tube 20 is connected via a flange connection 21 to one end of a tube elbow 22, the other end of which is flanged pressure-tight to an opening 23 in the central housing 2. The at least one optical waveguide 16 extends through the insulating tube 20, the tube elbow 22 and the opening 23 into the interior of the central housing 2 and from there on into the interior of the insulator column 1, where it is connected to ground. The at least one optical waveguide 16 has plug-type separation points to facilitate fitting. At the foot of the insulator column 1, the at least one optical waveguide 16 is led pressure-tight out of the interior of the switch and on into a converter and evaluator unit, not shown.

The opening 23 in the central housing may also be designed larger, for example, as shown in FIG. 1, and may serve as a fitting opening which can be closed pressure-tight by a separate closure cover. Such fitting openings are provided if a coupling together of the drive elements for the interrupter chamber 3 has to take place once the interrupter chamber 3 has been placed on the central housing 2. In this case, the tube elbow 22 has to be flanged to the closure cover, which must have a corresponding opening for leading through the at least one optical waveguide 16.

The insulating tube 20 serves together with the tube elbow 22 as a rigid sheath for the at least one optical waveguide 16. The insulating tube 20 may consist of porcelain, thermosetting synthetic resin or other insulating materials. In order to achieve the necessary dielectric strength, the insulating tube 20 is filled inside with the quenching and insulating medium of the high-voltage switch and has insulating screens on the outside. However, it is also possible to cast the at least one optical waveguide 16 continuously with thermosetting synthetic resin and thus, together with insulating screens on the outside, to achieve the necessary dielectric strength of the rigid sheath. It is also possible to fit between the insulating tube 20 and the tube elbow 22 a compensation element which can balance out different linear expansions between the rigid sheath and the interrupter chamber 3.

The measuring head 7 is of a similar design to the measuring head 6. A sensor 29 surrounds the supply terminal 5. An electronics unit 30 is connected to the sensor 29 by a measuring line 31. The sensor 29 and the electronics unit 30 are held by an intermediate flange 32, which is connected to the central housing 2. The supply terminal 5 passes through the intermediate flange 32 and is in electrically conductive connection with the lower part of the interrupter chamber 3 via the central housing 2. Together with a cover 34, the intermediate flange 32 forms a housing, which protects the measuring head 7 against environmental effects. From the electronics unit 30, at least one optical waveguide 36 leads in a known way through a borehole in the intermediate flange 32 and an opening 37, provided with a pressure-tight lead-through, into the central housing 2, and from there to ground.

To explain the operating principle, FIG. 1 should be considered more closely, or more specifically at first only the measuring head 6, which is at high-voltage potential. The sensor 9 generates a measuring signal proportional to the current flowing between the supply terminals 4 and 5. This measuring signal is sent through the measuring line 11 into the electronics unit 10. In this electronics unit 10, the measuring signal is converted into light pulses, which are transmitted from the high-voltage potential via at least one optical waveguide 16 to ground, where they are further processed in a converter and evaluator unit to form signals which can be used for purposes of measuring and protection. The energy supply of the electronics unit 10 may be provided by batteries, by the measuring signal itself or via a transformer which surrounds the supply terminal 4.

The sensor 9 may contain a current transformer, a Rogowski coil or otherwise a known measuring element. Furthermore, it is also possible to employ sensors 9 which utilize the Faraday effect in operating as magneto-optic current transformers. In the case of the latter variant, the electronics unit 10 may be dispensed with, since the at least one optical waveguide 16 itself is wound around the supply terminal 4 as a sensor, the light signal being generated at ground potential.

The measuring head 7 may be equipped correspondingly to the measuring head 6. It is also easily possible to install different sensors in the two measuring heads 6 and 7 to thus achieve better redundancy and less susceptibility to interference of the measuring system. Furthermore, it may also be sufficient, depending on the operating case, to fit only one of the measuring heads 6, 7. As they are very easily accessible, it is also possible to exchange sensors of one type for sensors of another type if there are any brief interruptions in operation.

FIG. 2 shows a high-voltage switch with two horizontally lying interrupter chambers 3, 3a. The right-hand interrupter chamber 3 is provided with a measuring head 6, like the one also shown in FIG. 1. The central housing 2 has a fitting opening covered pressure-tight with a closure cover 38. The tube elbow 22 is in this case flanged to this closure cover 38 and the optical waveguide 16 is led through the tube elbow 22 and a corresponding borehole in the closure cover 38 into the central housing 2. In FIG. 2, likewise no drive elements for actuation of the interrupter chambers 3, 3a are shown.

The left-hand part of FIG. 2 shows a further possible embodiment of a measuring head. A sensor 39 surrounds the interrupter chamber 3a on the drive side. An electronics unit 40 is connected to the sensor 39 via a measuring line 41. A multipart housing 43 encloses this measuring head and supports it, the internal diameter of the housing 43 being dimensioned such that it can be taken on the outside over the interrupter chamber 3a. From the electronics unit 40, an optical waveguide 46 is introduced pressure-tight into a tube elbow 47, and led through this and through the closure cover 38 into the central housing 2. The tube elbow 47 serves at the same time as support for the housing 43.

The housing 43 may also be designed such that it can be flanged together directly with the closure cover 38. In this case, a pressure-tight lead-through must be provided in the closure cover 38 for the optical waveguide 46.

If the interrupter chambers 3, 3a are fitted at an angle to each other, the elbow tubes 21 and 47 can be adapted to any angle.

In the case of high-voltage switches with more than two interrupter chambers in series, the measuring heads shown in FIG. 2 can likewise be installed. Furthermore, use of the measuring heads is not confined to high-voltage switches, they may similarly be fitted on high-voltage circuit-breakers and other switch gear.

In high-voltage switching systems in which bus bars are supported with respect to ground by means of insulator columns, such measuring heads can likewise be used advantageously, it being possible to place the sensors around the bus bar and lead the optical waveguides through the inside of the insulator columns, which as a rule are not under pressure, to ground in a particularly simple way.

I claim:

1. A high-voltage switch with a gaseous or liquid insulating medium, with at least one interrupter chamber (3, 3a) fixed on a central housing (2) supported by a hollow insulator column (1) with at least one measuring head (6, 7) in the region of the at least one interrupter chamber (3, 3a), in which at least one sensor (9, 29, 39) picks up current-proportional measuring signals which can be transmitted at ground potential via at least one optical waveguide (16, 36, 46) for further processing, wherein the at least one measuring head (6, 7) is accommodated in a housing (43) suitable for fitting outside on the high-voltage switch, and the at least one optical waveguide (16, 36, 46) is led pressure-tight through a closure cover (38) of a fitting opening into the central housing (2).

2. The high-voltage switch as claimed in claim 1, wherein the at least one optical waveguide (16, 36, 46) between measuring head (6, 7) and central housing (2) is surrounded by a rigid, at least one-part sheath.

3. The high-voltage switch as claimed in claim 2, wherein the rigid sheath is designed at least partially of thermosetting synthetic resin such that it continuously surrounds the at least one optical waveguide (16, 36, 46).

4. The high-voltage switch as claimed in claim 2, wherein the rigid sheath is designed at least partially as an insulating tube (20), the interior of which is filled with the insulating medium.

5. The high-voltage switch as claimed in claim 4, wherein the rigid sheath has a compensation element.

6. The high-voltage switch as claimed in claim 5, wherein a part of the rigid sheath is designed as a tube elbow (22, 47) which can be flanged onto the closure cover (38).

7. The high-voltage switch as claimed in claim 1, wherein the housing (43) containing the measuring head is designed such that it can be flanged together with the closure cover (38) for the fitting opening of the central housing (2).

8. The high-voltage switch as claimed in claim 2, wherein the rigid sheath has a compensation element.

9. The high-voltage switch as claimed in claim 3, wherein the rigid sheath has a compensation element.

10. The high-voltage switch as claimed in claim 2, wherein a part of the rigid sheath is designed as a tube elbow which can be flanged onto the closure cover.

11. The high-voltage switch as claimed in claim 3, wherein a part of the rigid sheath is designed as a tube elbow which can be flanged onto the closure cover.

12. The high-voltage switch as claimed in claim 4, wherein a part of the rigid sheath is designed as a tube elbow which can be flanged onto the closure cover.

* * * * *